United States Patent
Shelke et al.

(10) Patent No.: US 12,021,807 B2
(45) Date of Patent: Jun. 25, 2024

(54) AGGREGATION AND AGGREGATION OMISSION OF MESSAGES

(71) Applicant: Avaya Management L.P., Durham, NC (US)

(72) Inventors: Sudhir Shelke, Pune (IN); Valentine C. Matula, Granville, OH (US)

(73) Assignee: Avaya Management L.P., Durham, NC (US)

( * ) Notice: Subject to any disclaimer, the term of this patent is extended or adjusted under 35 U.S.C. 154(b) by 367 days.

(21) Appl. No.: 17/199,554

(22) Filed: Mar. 12, 2021

(65) Prior Publication Data

US 2022/0294752 A1   Sep. 15, 2022

(51) Int. Cl.
   *H04L 51/18*    (2022.01)
   *G06F 40/279*   (2020.01)
   *G06N 3/04*     (2023.01)
   *G06N 3/08*     (2023.01)

(52) U.S. Cl.
   CPC ............ *H04L 51/18* (2013.01); *G06F 40/279* (2020.01); *G06N 3/04* (2013.01); *G06N 3/08* (2013.01)

(58) Field of Classification Search
   CPC ......... H04L 51/18; G06F 40/279; G06N 3/04; G06N 3/08
   See application file for complete search history.

(56) References Cited

U.S. PATENT DOCUMENTS

| | | | |
|---|---|---|---|
| 2013/0346408 A1* | 12/2013 | Duarte | H04M 19/04 707/737 |
| 2015/0106742 A1* | 4/2015 | Kim | H04L 51/046 715/752 |
| 2017/0149713 A1* | 5/2017 | Bastide | H04L 51/06 |
| 2019/0171693 A1* | 6/2019 | Dotan-Cohen | G06F 40/106 |
| 2020/0372404 A1* | 11/2020 | Mahmud | G06N 20/00 |
| 2020/0387675 A1* | 12/2020 | Nugent | G06F 16/35 |
| 2021/0194843 A1* | 6/2021 | Vendrow | H04L 51/23 |
| 2022/0224663 A1* | 7/2022 | Liu | H04L 51/42 |

* cited by examiner

*Primary Examiner* — Sonia L Gay
(74) *Attorney, Agent, or Firm* — Sheridan Ross P.C.

(57) ABSTRACT

Messages, such as text messages, emails, and social media posts, are a popular way to communicate, however, messages can be overwhelming. In order to better manage messages, messages may be grouped, such as those having a common topic. A recipient may then address the grouped messages as a group. However, certain messages may have a common topic but have an attribute that warrants maintaining the message as individual messages, excluded from the group. For example, the message may be from someone who rarely communicates with the recipient, a celebrity, an important figure at work or in politics, a family member, or other attribute that would warrant exclusion from a common topic group.

20 Claims, 6 Drawing Sheets

Fig. 1

| Attribute | Threshold 1 | Threshold 2 | Threshold 3 |
|---|---|---|---|
| Family | <All> | <null> | <null> |
| Business Relationship | Same department | Same or higher level | <null> |
| Common interest(s) | Cycling club | Archery | <null> |
| Political Figure | My representatives | National tier | <null> |
| Celebrity | 100M+ search results | 5M+ YouTube subscribers | Listed in IMDB.com |
| Number of messages sent | <50 day | <null> | <null> |
| Overall number of messages received | <100 per day | <null> | <null> |
| Common topic number of messages received | <10 per day | <null> | <null> |
| Ratio of common topic messages to all messages | <15% | <null> | <null> |

AGGREGATION AND AGGREGATION OMISSION OF MESSAGES

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for processing messages and particularly to aggregating messages from certain nodes and not aggregating messages from exception nodes.

BACKGROUND

Social media applications, such as Facebook, Instagram, Twitter, LinkedIn, etc. and messaging applications, such as WhatsApp, MOC/Lync, Avaya Workplace, etc., are popular tools for individuals and groups to exchange messages and other content. Currently, 53% of the Earth's population uses social media. Many users share ideas, thoughts, and information through virtual networks and communities and send other messages on messaging application, either person to person (P2P) or in multiparty conversations.

Intermixed with interesting and useful posts, a lot of the messages received are not interesting, meaningful, or useful. For example, even if a topic of a message is initially meaningful, similar posts or messages from many users are merely repetitive and may even become tedious. A user may need to ignore or scroll through posts and messages that are redundant or otherwise uninteresting in order to identify useful or otherwise interesting posts. As a result, users may become irritated and dismissive of messages, which may cause important or otherwise interesting messages to be missed. For example, a relevant work message may be overlooked if buried in a pool of repetitive messages wishing the recipient a happy birthday or directed to a particular current event.

SUMMARY

Manually reviewing each message to delete, hide, or dismiss irrelevant messages, such as when messages are merely duplicative, is tedious and error-prone. Important messages may be missed merely because of proximity to other messages directed to repetitive or otherwise uninteresting messages. Even messages that may have duplicative content may comprise attributes that sets them apart from other messages. For example, if a user decides to search for all messages with "happy birthday" in the subject and group all message together for common treatment, such as to delete the grouping or mark for later review—which may or may not occur. However, such a search would cause all messages matching the search to be subject to the same treatment. If the source of the message was important, relevant, or unusual, such as a "happy birthday" message from a boss, Prime Minister, celebrity, etc., users may be keenly interested in such a message, even if the content was the same, or substantially the same, as a pool of other messages from other parties. As a result, messages that may be interesting or otherwise relevant may be inadvertently overlooked.

These and other needs are addressed by the various embodiments and configurations of the present invention. The present invention can provide a number of advantages depending on the particular configuration. These and other advantages will be apparent from the disclosure of the invention(s) contained herein.

Messages that are the same or substantially the same may be grouped and addressed by the recipient as a group (e.g., dismiss/ignore all fifty messages related to a particular current event). If the user wishes to expand a grouping, such as to see individual messages within a grouping of 200 "Happy Birthday" posts, the grouping may be expanded into subgroups or the individual postings/messages. However, attributes of a message may be unique or otherwise meaningful to cause the message, even if otherwise common to a group, to not be aggregated or de-aggregated from the group, such as to be removed/excluded from the group and/or flagged or otherwise marked as unique.

The particular factors considered for de-aggregation are variously embodied and include, but are not limited to, one or more of a count of posts/message from the sender received by the recipient, message content being similar to the group(s), an interested common between the recipient and sender, time and date posted, number of messages received by the recipient, relationship between sender and recipient, and/or social, political, professional, or celebrity stature of the sender.

In one embodiment, an artificially intelligent (AI) agent, such as a neural network, is trained and utilized to determine messages and posts that will or will not be aggregated into a group. The group may then be presented to the recipient as a group and treated (e.g., deleted, hidden, ignored, responded to, etc.) as a group. The recipient may optionally open the group and review and treat the messages and posts therein individually. Messages and posts that are not aggregated into the group maintain uniqueness within the system and may optionally be identified as an exception.

In another embodiment, messages and posts may be aggregated into a number of groups, which may maintain a hierarchical or other relationship between the groups. For example, one group may comprise all posts and messages with "Happy Birthday" in the subject and/or body of the message. A subgroup may comprise "Happy Birthday" messages from a group of common associates (e.g., individuals who post frequently on many topics, work associates, etc.), another group may be designated for message from family members, etc. Certain sub-groups may optionally be marked for special treatment, such as elder family members within the "family" subgroup. The recipient of the messages, and presentation as individual messages or as group(s) of messages, may be an individual or an organization (e.g., business, school, government entity, etc.). For example, a government entity, such as a 911 dispatch center, may receive a large number of messages regarding an event or a school may receive a large number of messages asking, "Will the power outage near the science building cause classes to be canceled?" The school may respond with a single message, which is then copied and delivered as a response to all messages in the group, such as, "Morning classes in the science building are canceled, afternoon classes will meet as usual."

The AI may be seeded with a set of explicit rules for repetitive, duplicative, redundant, or otherwise groupable messages and posts. Conversely, the AI may be seeded with a set of rules for messages that are never to be aggregated into a group. As a user utilizes the system, inputs received for messages may be utilized to teach the AI. For example, if a user manually groups a set of messages or posts together based on a particular subject, such as the weather or a particular current event, the system may extract elements from each message (e.g., amount of rain, wind, temperature, clouds, etc.) and determine a commonality and group future messages accordingly. If the recipient individually reads, and optionally handles (e.g., responds, forwards, etc.) each message, then messages related to "weather" may be omitted from aggregating into groups so as to be handled individual by the recipient.

As a further option, the AI may be trained by multiple users and/or multiple systems. For example, a user or AI of one system that aggregates all weather-related messages together may cause a second system to aggregate messages that are similarly weather related. Additionally or alternatively, if a recipient is a member of a particular demographic (e.g., employee of a particular company, age, gender, profession, residential neighborhood, etc.) and an above-threshold number of similar users always aggregate messages with a certain topic, then other members having similar attributes may have such messages aggregated. This may be tentative and, upon receiving an override, reversed.

In yet another embodiment, a recipient may request a sampling of messages aggregated into a group. For example, a sample size, such as one or two or 10%-20%, messages may be selected randomly or via other means (e.g., newest, oldest, etc.) and presented as if not aggregated into a group. If the user has the opportunity to select more messages, but does not, the grouping logic may be determined to be appropriate. In contrast, if the user selects a sample message and reviews or interacts with any one or more of the selected messages, the grouping logic may be determined to be in error and future messages having similar attributes not aggregated into the group.

As a further option, the automated agent may randomly or periodically execute a non-aggregation for messages that would otherwise be aggregated. For example, if a topic is routinely aggregated, the system may, on occasion does not aggregate such messages and observe if the recipient interacts with any one or more. If, for example, the user interacts with a statistically significant number of the messages, the aggregation may be in error and discontinued. However, if the user interactions with only a portion of the messages, a subsequent analysis of the messages may be performed, such as to determine whether the messages did have unique content and, if not, if the sender, sender's domain, or attribute of the sender (such as may be identified from other systems), such as position, location, rank, title, popularity, occupation, etc., is an outlier and, if so, identify such attributes and/or attributes having a specific value to be excluded from aggregation into a group.

In one embodiment, a method is disclosed, comprising: receiving, by a recipient node on a network, a plurality of messages sent by a plurality of sending nodes; identifying a first group comprising a first subset of the plurality of messages each having a common topic and not comprising an attribute matching an exception; identifying a second group comprising a second subset of the plurality of messages having the common topic and comprising an attribute matching an exception; presenting, on a user device, indicia of a first group, identifying the first subset; and presenting, on the user device, a number of indicia corresponding to each of the plurality of messages in the second subset.

In another embodiment, a system is disclosed, comprising: a network interface to a network; a user device configured to present content and receive inputs from a user; a processor comprising machine-readable instructions maintained in a non-transitory memory that, when read by the processor, cause the processor to: receive a plurality of messages sent a plurality of sending nodes; identify a first group comprising a first subset of the plurality of messages each having a common topic and not comprising an attribute matching an exception; identify a second group comprising a second subset of the plurality of messages having the common topic and comprising an attribute matching an exception; present, on a user device, indicia of a first group, identifying the first subset; and present, on the user device, a number of indicia corresponding to each of the plurality of messages in the second subset.

In another embodiment, a system is disclosed, comprising: means to receive a plurality of messages sent a plurality of sending nodes; means to identify a first group comprising a first subset of the plurality of messages each having a common topic and not comprising an attribute matching an exception; means to identify a second group comprising a second subset of the plurality of messages having the common topic and comprising an attribute matching an exception; means to present, on a user device, indicia of a first group, identifying the first subset; and means to present, on the user device, a number of indicia corresponding to each of the plurality of messages in the second subset.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
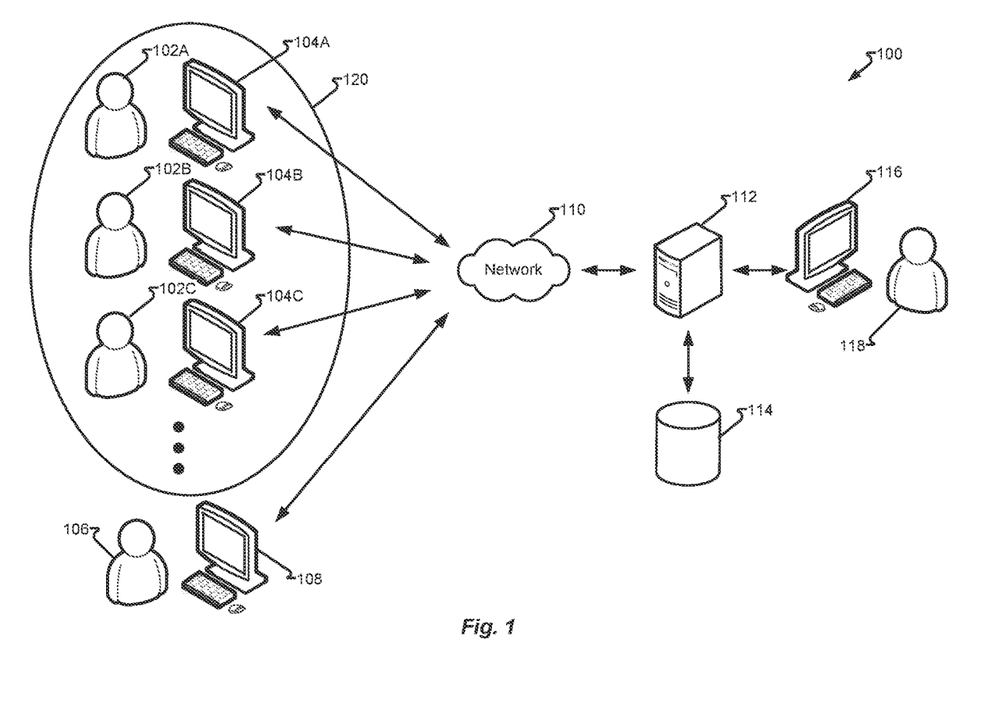
FIG. 1 depicts a first system in accordance with embodiments of the present disclosure.

FIG. 1 depicts system 100 in accordance with embodiments of the present disclosure. In one embodiment, recipient 118 via recipient device 116 is presented with a number of messages. The messages may be one or more of emails, simple messaging system (SMS) text, chat message, posts on a social media site allocated to recipient 118, and/or other messaging system or combination thereof. The messages originate from user 102A-C utilizing user device 104A-C and user 106 utilizing user device 108 to send messages via network 110 to server 112. Server 112 may store and/or process the messages based on data maintained in records or other data structures maintained in data storage 114.

In one embodiment, recipient 118 may be the recipient of a number of messages having a common topic. The topic may be identified in a subject line, message body, and/or metadata of the message. Message are received and processed by server 112, such as at least one processor of server 112 executes a messaging server and/or at least one processor of recipient device 116 executes a messaging client. If a message has a unique topic, that is the message is determined to comprise a topic that is unique to all messages received by server 112/recipient device 116 for recipient 118. A message may be unique if it comprises a topic below a previously determined threshold amount and/or over a previously determined period of time. For example, a message may be unique if only five messages have been received within the past week for the topic therein.

When messages all comprise the same topic, recipient 118 may be presented with an aggregation of the messages and not individual messages. It should be appreciated that, as used herein, being presented with a message and/or group indica for a set of messages comprises recipient device 116 presenting the message and/or identifier for the set of messages, or selectively hiding the message and/or group indica, when the order (e.g., date/time received) places the message and/or group indica on a hidden page or portion of a display. When the order places the message and/or group indica on a revealed page or portion of the display, the message and/or group indica is presented. For example, if recipient device 116 is currently presenting older messages, a message and/or group indica for a message and/or group of messages received recently may be hidden, such as by being scrolled or paged off the current display. When recipient 118 scrolls or pages to those messages that are more current, such as a timeframe associated with the message and/or group indica, the message and/or group indica is presented on recipient device 116.

By displaying messages determined have a common topic, recipient 118 may be presented with a group indica of the set of messages that comprise the group and not the individual messages. If recipient 118 elects to review the messages individually, indicia of each message of the set of messages may be presented on recipient device 116. However, recipient 118 may elect to initiate an action on the group of messages, as a group and not the individual messages therein. For example, recipient 118 may select a group indicia and an action, such as hide, delete, mark as read, etc., and recipient device 116 marks the group accordingly and alone and/or causes server 112 to performs any actions on the individual messages within the group, such as those described in more detail with respect to FIG. 3.

While grouping messages that have a common topic has benefits namely, to reduce duplicative messages to a single entry and to allow those messages that are not members of the group to stand out. For example, a message from user 106 who may be a celebrity, boss, or family member via user device 108 may be excluded from a group of "happy birthday" messages received from other parties (e.g., friends, work associates, etc.), thereby allowing such messages to stand out and not overlooked or inadvertently given the same treatment as group 120, such as comprising user 102A-C, which may be routine senders and ignored, addressed later, or otherwise handled by recipient 118. Similarly, messages that are excluded due to a lack of commonality with the common topic, remain grouped or may be added to a different group based on the embodiments described herein.

It should be appreciated that variations to the topology illustrated may be provided without departing from the embodiments described herein. For example, recipient device 116 may comprise server 112 and/or data storage 114. Alternatively, server 112 and/or data storage 114 may be embodied as a number of components, such as processor(s), processing devices, storage devices, etc., such as a processing/storage array, server farm, "cloud," etc. While user device 104A-C, user device 108, and recipient device 116 are illustrated as desktop computers, other computing devices comprising at least one processor and a network interface to network 110, or optionally an intermediate network connectivity device (not shown), such as router, hub, switch, etc., may be utilized including, but not limited to, a smart phone, tablet computer, laptop computer, smart watch, etc.

Figure 2:
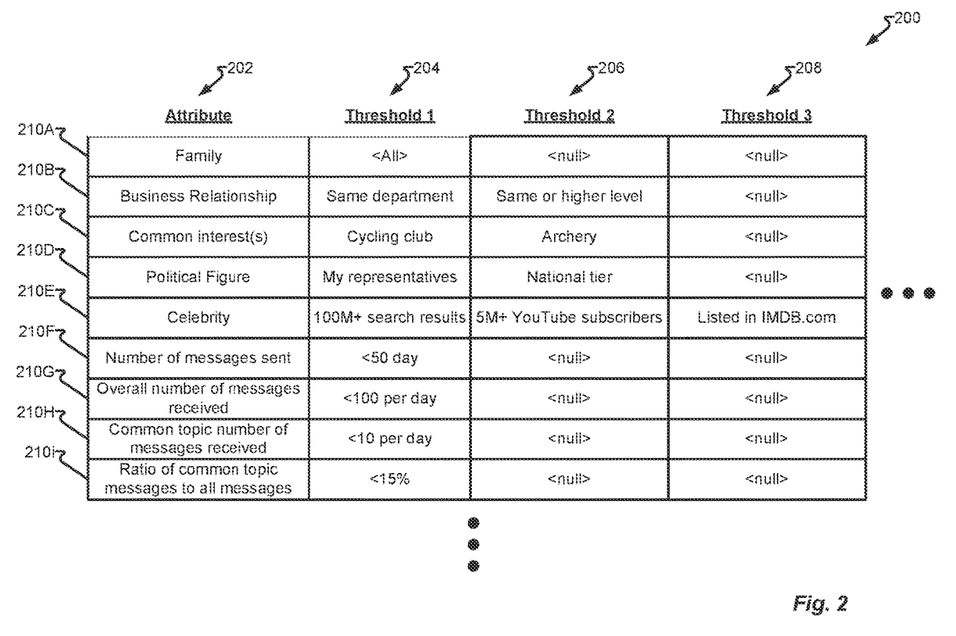
FIG. 2 depicts a data structure in accordance with embodiments of the present disclosure.

FIG. 2 depicts data structure 200 in accordance with embodiments of the present disclosure. In one embodiment, data structure 200 is maintained in data storage 114 and comprises a number of records 210. Records 210 are variously embodied and may include records 210A-i (lower case "i" being used herein to avoid confusion with the number one that may result had upper case letter "I" been used). In other embodiments, more, fewer, and/or different contents of one or more records 210 are provided.

Records 210 comprise attribute field 202, such as to identify the type of attribute a message may have or be associated with. Records 210 may have one or more attribute threshold fields, such as threshold fields 204, 206, 208, and optionally additional fields to maintain one or more conditions and/or thresholds. A message received, such as by server 112 for recipient device 116 for recipient 118, may be evaluated to determine if the message matches a "family" from attribute field 202 for record 210A, such as to cause server 112 to identify senders from an address book accessible to server 112, such as when maintained in data storage 114, that identifies a sender (e.g., one of user 102A-C or user 106) as "family". Threshold field 204 for record 210A indicates that "all" is to be utilized. As a result, all messages message received from senders that match "family" will be excluded from being grouped with other messages, even if the subject of the message has a topic that matches a common topic. Values of threshold fields 204, 206, 208 that are "null" indicate no value and therefore will not be used to determine if a particular message with a common topic will be excluded being grouped.

Similarly, record 210B comprises attribute field 202 with a value of "business relationship." The threshold value includes "same department" in threshold field 204, "same or higher level" in a corporate hierarchy, in threshold field 206. Recipient 118 may have other interests that are selected or learned, such as by server 112, that cause corresponding messages to be omitted from grouping. This may include hobbies or other interests specified in record 210C, certain political figures specified in record 210D, celebrities specified in record 210E, etc.

In another embodiment, data structure 200 may define which messages are to be excluded from grouping based on the relationship to other messages. For examples, certain systems may allow messages sent by a party to be counted and, for example, if a sending party sends a lot of messages routinely, such as more than fifty a day, as specified in record 210F and threshold field 204, then the message is not excluded or, in other words, if the sender sends less than fifty a day, the message is excluded from being added to a group. In record 210G, if recipient 118 receives less than a hundred messages, as described in threshold field 204 then no message is added to a group. In record 210H, if messages having a common topic are less than ten, as described in threshold field 204, then the messages are not added to a group. In record 210i, if the ratio of messages having a common topic is less than fifteen percent of all messages, as defined by threshold field 204, then the messages are not added to a group. Messages that are not excluded from the group, but have the common topic, are then added to the group. While the foregoing examples describe conditions to exclude a particular message, based on an attribute of the message, sender, recipient, other messages, etc., it should be appreciated that data structure 200 may comprise one or more records 210 that identify message attributes that, if matched to a message, cause the message to be added to a group.

In another embodiment, records 210 may be in a hierarchical or other order such that once a message matches a particular rule, as a match to an entry in attribute field 202 for a particular record 210, further processing with other records 210 may be omitted or performed with respect to only specifically identified records 210. For example, if a message is received by a celebrity (e.g., having an attribute associated attribute field 202 and a value attribute at or above one or more threshold fields 204, 206, or 208, then the message may be excluded from a group, regardless of any other matching conditions defined by attribute field 202 for any other record 210.

Figure 3:
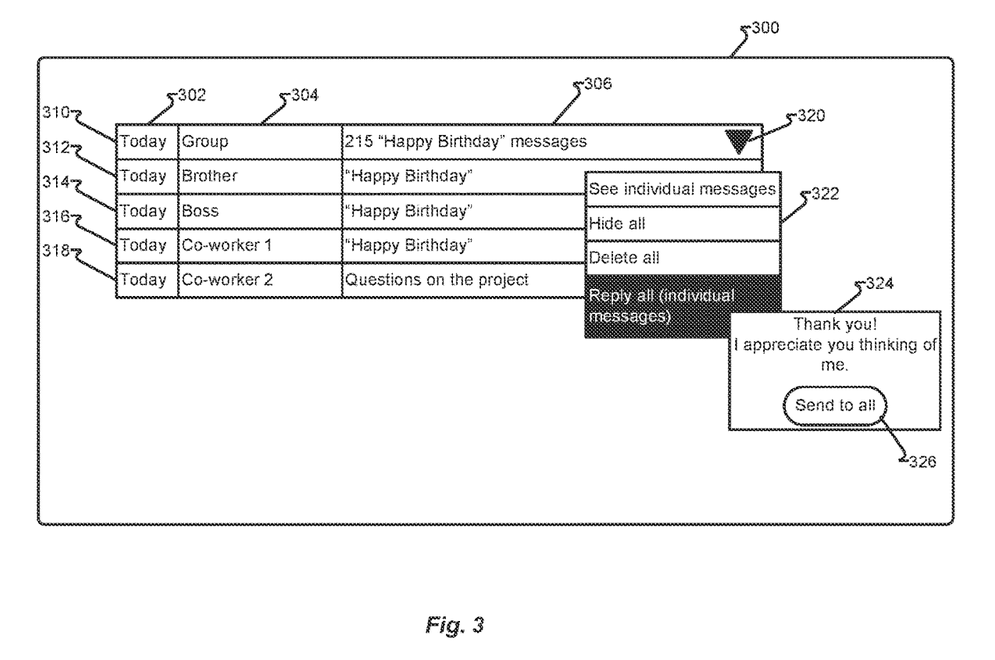
FIG. 3 depicts a device display in accordance with embodiments of the present disclosure.

FIG. 3 depicts device display 300 in accordance with embodiments of the present disclosure. In one embodiment, recipient device 116 comprises device display 300 presenting indicia of messages and group(s) thereon and receiving inputs via keyboard, mouse, touch screen, touch pad, voice command, and/or other signal from an input device.

In one embodiment, device display 300 illustrates a number of group indicia 310 and message indicia 312, 314, 316, and 318. The indicia may further include values for operation symbol 320, having the date/time in date field 302 the message was received; sender field 304 identifying the sender of the message or, in the case of a group of messages, identifying the message as a group message; and subject field 306 identifying the subject of the message corresponding to message indicia 312, 314, 316, and 318 and the common topic for a group of messages identified by group indicia 310.

Group indicia 310 may have a value maintained in operation symbol 320 of the most resent message added to the group. Additionally or alternatively, subject field 306 may comprise a count or other indicia of the number of messages group together and presented as group indicia 310. For message indicia 312, 314, 316, and 318, operations such as read, file, delete, mark as read, reply, reply-all, forward, etc., (not shown) may be utilized to manage the messages individually.

In another embodiment, group messages, such as indicated by group indicia 310 may allow for group operations, indicated by operation symbol 320—such as a triangle, menu option, or other graphical element to indicate operations are available for all messages maintained within the corresponding group. Selecting (e.g., mouse click, touch, etc.) operation symbol 320 presents options 322. Options 322 may be further segmented into the various group operations available, such as to hide the group, delete the group, or generate a reply to the group, such as to generate single message 324 that is sent as individual messages upon selecting send to all button 326. As a result, individual messages are sent to each sender of a message maintained in a group. If a particular single message maintained within a group has multiple recipients, the reply message may be addressed to each party, but not include senders or others (those copied on a message) from other messages. However, as another embodiment, a "reply all" option may be provided to allow a single message to be sent and listing the senders (and optional others copied) in a single message.

Figure 4:
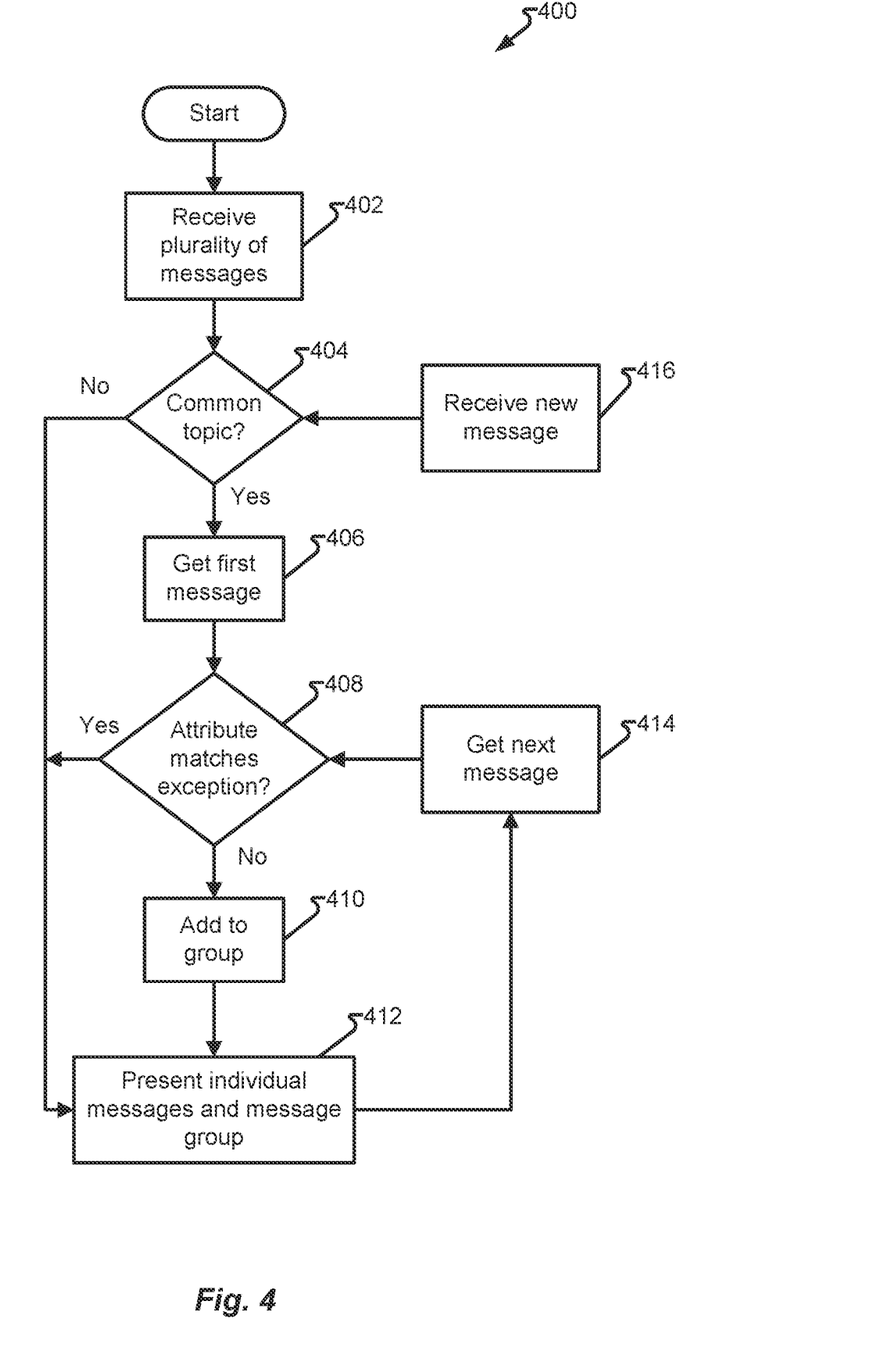
FIG. 4 depicts a first process in accordance with embodiments of the present disclosure.

FIG. 4 depicts process 400 in accordance with embodiments of the present disclosure. Process 400 may be embodied as machine-readable instructions maintained in a non-transitory storage that, when read by a processor, such as a processor of server 112 and/or a processor of recipient device 116, cause the processor to perform the steps of process 400. Process 400 begins and, at step 402, a plurality of messages is received, such as via network 110 from one or more nodes, which may include one or more of user device 104A-C, user device 108, and/or other networked devices, mail servers, message server, and/or social media server.

Next, test 404 determines if the messages have a common topic. For example, a "word cloud," synonymous terminology, etc., may be utilized to determine if the plurality of messages recite a common subject. As will be described more completely with respect to embodiments that follow, an AI, such as a neural network may determine if the topic of the plurality of messages are a common topic. If test 404 is determined in the negative, processing continues to step 412. If test 404 is determined in the affirmative, processing continues to step 406 where a first message of the plurality of messages is accessed. Test 408 determines if the message, having a common topic, is associated with an attribute that matches an exception, such as those described with respect to FIG. 2.

If test 408 is determined in the affirmative, the message is an exception and omits being grouped. Accordingly, processing continues to step 412. If test 408 is determined in the negative, processing continues to step 410. Step 410 adds the message to the group and step 412 presents the messages, as indicia corresponding to individual messages when not added to a group, or as indicia corresponding to a group of messages when added to a group.

Processing continues to step 414, such as to access a next message and loop back to test 408. If a new message is received in step 416, processing similarly continues to test 404. Process 400 may continue indefinitely, such as to continually update messages and groups as new messages are received.

Figure 5:
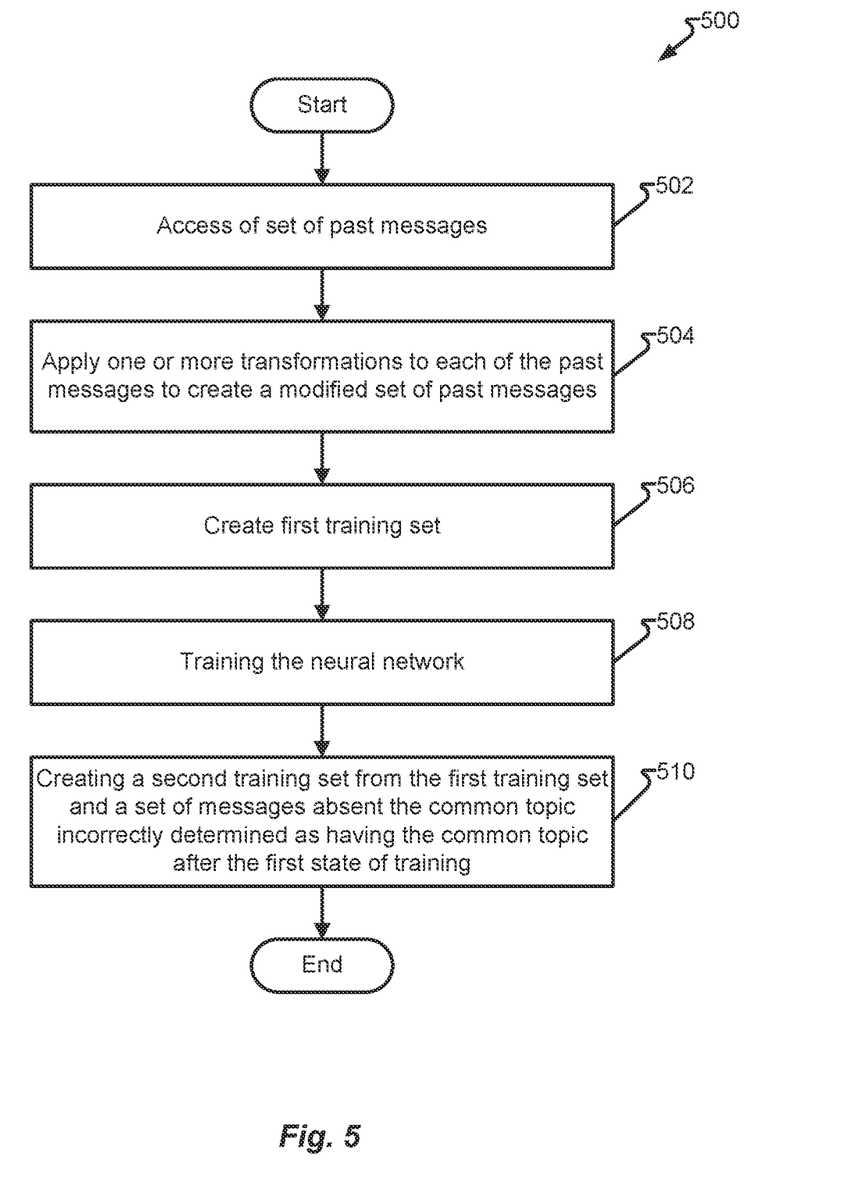
FIG. 5 depicts a second process in accordance with embodiments of the present disclosure.

FIG. 5 depicts process 500 in accordance with embodiments of the present disclosure. Process 500 may be embodied as machine-readable instructions maintained in a non-transitory storage that, when read by a processor, such as a processor of server 112 and/or a processor of recipient device 116, cause the processor to perform the steps of process 500.

A neural network, as is known in the art and in one embodiment, self-configures layers of logical nodes having an input and an output. If an output is below a self-determined threshold level, the output is omitted (i.e., the inputs are within the inactive response portion of a scale and provide no output), if the self-determined threshold level is above the threshold, an output is provided (i.e., the inputs are within the active response portion of a scale and provide an output), the particular placement of the active and inactive delineation is provided as a training step or steps. Multiple inputs into a node produce a multi-dimensional plane (e.g., hyperplane) to delineate a combination of inputs that are active or inactive.

Process 500 begins and, at step 502 a set of past messages are accessed, such as from data storage 114 and/or other storage. The past messages having a common topic. In step 504 one or more transformations are applied to create a modified set of past messages. The transformations may include, but are not limited to replacing one or more words with one or more synonymous words, removing a first unique topic, and adding a second unique topic. A modified set of past messages is created from the messages having the one or more transformations.

Next, in step 506 a first training set is created from the set of past messages and modified set of past messages and, in step 508, used to train the neural network. Step 510 creates a second training set from the first training set and a set of messages absent the common topic but incorrectly determined as having the common topic after the first training in step 508.

In another embodiment, user 102 may decide to review the individual messages within a group of messages. Upon reviewing the individual messages, a particular individual message may be selected and acted upon in a manner different from one or more other messages within the group. For example, a particular message is read and an individual reply sent. As a result, the sender of the individual message may be determined to be an exception and future messages from the sender excluded from grouping. Additionally or alternatively, attributes of the sender of the individual message may be discovered (e.g., via an address book, social media connection, etc.). Attribute may include title, occupation, interests, location, other association with recipient, etc., and, if common to other senders of future messages, the attribute added to the exceptions. For example, a "happy birthday" message is received from a sender, which recipient 118 discovers within a group and either explicitly marks the message as to be excluded from grouping or provides a unique action, such as typing and sending an individual reply. If the sender is discovered to live nearby recipient 118, then an exception may be automatically generated to exclude "neighbors" from future groupings. Additionally or alternatively, an existing group may be re-processed and any messages from "neighbors" extracted from the group and maintained as individual messages.

As a further embodiment, a processor of server 112 and/or recipient device 116 may select an individual message that has been added to a group to be extracted from the group and presented individually. If recipient 118 interacts with the message, as an individual message, an exception may be added to the group for an attribute of the message and/or rule utilized to determine the common topic, which may include the neural network, trained to identify such message as erroneously determined to have a common topic. However, if recipient 118 interacts with the message in the same way as the group, the grouping is accurate and the neural network and/or rule to determine common topics and/or an absence of an exception are reinforced.

Figure 6:
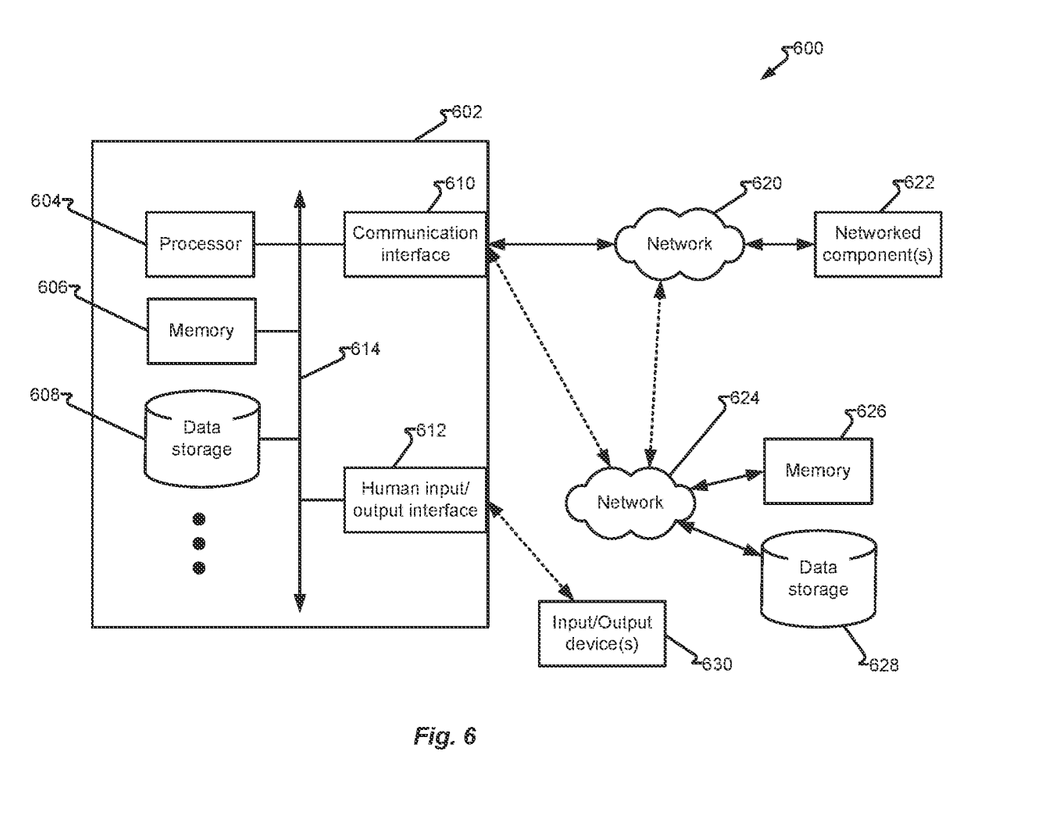
FIG. 6 depicts a device of a second system in accordance with embodiments of the present disclosure.

FIG. 6 depicts device 602 in system 600 in accordance with embodiments of the present disclosure. In one embodiment, server 112 and/or recipient device 116 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

Network 110 may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
    receiving, by a recipient node on a network, a plurality of messages sent by a plurality of sending nodes;
    identifying a first group comprising a first subset of the plurality of messages, each having a common topic and not comprising an attribute matching an exception and wherein the attribute matching the exception comprises a sender attribute of a sender;
    identifying a second group comprising a second subset of the plurality of messages having the common topic and comprising the attribute matching the exception;
    presenting, on a first portion of a user device, indicia of the first group, identifying the first subset; and
    presenting, on a second portion of the user device, a number of indicia corresponding to each of the plurality of messages in the second subset.

2. The method of claim 1, further comprising:
    receiving an input to the user device indicating an action and further indicating a target of the action is the indicia of the first group; and
    automatically applying the action to each message of the first subset.

3. The method of claim 1, further comprising:
    receiving an input on the user device, the input indicating an action and further indicating a target of the action is one of the number of indicia; and
    automatically applying the action to one of the plurality of messages corresponding to the one of the number of indicia.

4. The method of claim 1, wherein each message comprises at least one of a text message, an email message, or a posting on a social media website.

5. The method of claim 1, wherein the common topic is determined by receiving a decision from a neural network trained to determine whether the plurality of messages comprises the common topic.

6. The method of claim 5, wherein receiving the decision from the neural network further comprises receiving the decision from the neural network after the neural network has trained to determine whether the plurality of messages comprises the common topic, the training of the neural network comprising:
    accessing a set of past messages;
    applying one or more transformations to each message of the set of past messages to create a modified set of past messages, wherein the one or more transformations comprise replacing one or more words with one or more synonymous words, removing a first unique topic, and adding a second unique topic;

creating a first training set comprising the set of past messages, the modified set of past messages, and a set of messages absent the common topic;

training the neural network in a first state using the first training set;

creating a second training set of a second state of training comprising the first training set and the set of messages absent the common topic that are incorrectly identified as having the common topic; and training the neural network in the second state using the second training set.

7. The method of claim 1, wherein the attribute matching the exception further comprises a total number of messages of the plurality of messages having the common topic that is greater than a previously determined threshold.

8. The method of claim 1, wherein the attribute matching the exception further comprises a sender importance attribute of a sender of one of the plurality of sending nodes, and wherein the sender importance attribute comprises indicia of a relationship type with a user receiving the plurality of messages.

9. The method of claim 1, wherein the attribute matching the exception further comprises a sender importance attribute of a sender of one of the plurality of sending nodes, and wherein the sender importance attribute comprises indicia of a relationship type with a population of people comprising a user receiving the plurality of messages.

10. The method of claim 1, wherein the attribute matching the exception comprises a sender group attribute of the sender indicating a member of a group common with a recipient of the plurality of messages.

11. A system, comprising:
a network interface to a network;
a user device configured to present content and receive inputs from a user; and
a processor comprising machine-readable instructions maintained in a non-transitory memory that, when read by the processor, cause the processor to:
receive a plurality of messages sent by a plurality of sending nodes;
identify a first group comprising a first subset of the plurality of messages, each having a common topic and not comprising an attribute matching an exception and wherein the attribute matching the exception comprises a sender attribute of a sender;
identify a second group comprising a second subset of the plurality of messages having the common topic and comprising the attribute matching the exception;
present, on a first portion of the user device, indicia of the first group, identifying the first subset; and
present, on a second portion of the user device, a number of indicia corresponding to each of the plurality of messages in the second subset.

12. The system of claim 11, wherein the instructions further cause the processor to:
receive an input to the user device indicating an action and further indicating a target of the action is the indicia of the first group; and
automatically apply the action to each message of the first subset.

13. The system of claim 11, wherein the instructions further cause the processor to:
receive an input on the user device, the input indicating an action and further indicating a target of the action is one of the number of indicia; and
automatically apply the action to one of the plurality of messages corresponding to the one of the number of indicia.

14. The system of claim 11, wherein each message comprises at least one of a text message, an email message, or a posting on a social media website.

15. The system of claim 11, wherein the instructions to cause the processor to determine the common topic, further comprise instructions to receive a decision from a neural network trained to determine whether the plurality of messages comprises the common topic.

16. The system of claim 15, wherein the instructions to cause the processor to receive the decision from the neural network further comprise instructions to cause the processor to receive the decision from the neural network after the neural network has trained to determine whether the plurality of messages comprises the common topic, the training of the neural network comprising instructions to cause the processor to:
access a set of past messages;
apply one or more transformations to each past message of the set of past messages to create a modified set of past messages, wherein the one or more transformations comprise replacing one or more words with one or more synonymous words, removing a first unique topic, and adding a second unique topic;
create a first training set comprising the set of past messages, the modified set of past messages, and a set of messages absent the common topic;
train the neural network in a first state using the first training set;
create a second training set of a second state of training comprising the first training set and the set of messages absent the common topic that are incorrectly identified as having the common topic; and
train the neural network in the second state using the second training set.

17. The system of claim 11, wherein the attribute matching the exception further comprises a total number of messages of the plurality of messages having the common topic that is greater than a previously determined threshold.

18. The system of claim 11, wherein the attribute matching the exception further comprises a sender importance attribute of a sender of one of the plurality of sending nodes.

19. The system of claim 11, wherein the attribute matching the exception further comprises a sender group attribute of the sender indicating a member of a group common with a recipient of the plurality of messages.

20. A system, comprising:
means to receive a plurality of messages sent by a plurality of sending nodes;
means to identify a first group comprising a first subset of the plurality of messages, each having a common topic and not comprising an attribute matching an exception and wherein the attribute matching the exception comprises a sender attribute;
means to identify a second group comprising a second subset of the plurality of messages having the common topic and comprising the attribute matching the exception;
means to present, on a first portion of a user device, indicia of the first group, identifying the first subset; and means to present, on a second portion of the user device, a number of indicia corresponding to each of the plurality of messages in the second subset.

* * * * *